United States Patent [19]

Royer et al.

[11] 3,975,509

[45] Aug. 17, 1976

[54] PROCESS FOR PRODUCING ALPHA ALUMINA MONOHYDRATE

[75] Inventors: Dennis Jack Royer; George G. Hritz, both of Ponca City, Okla.

[73] Assignee: Continental Oil Company, Ponca City, Okla.

[22] Filed: Apr. 3, 1975

[21] Appl. No.: 564,946

Related U.S. Application Data

[63] Continuation of Ser. No. 298,116, Oct. 16, 1972, abandoned.

[52] U.S. Cl. .............................. 423/626; 423/628; 423/630; 252/463
[51] Int. Cl.² ........................................ C01F 7/02
[58] Field of Search ............ 423/625, 628, 626, 630

[56] References Cited
UNITED STATES PATENTS

| | | | |
|---|---|---|---|
| 2,595,416 | 5/1952 | Schmerling | 423/626 |
| 3,353,910 | 11/1967 | Cornelius et al. | 423/626 |
| 3,357,791 | 12/1967 | Napier | 423/630 |
| 3,403,111 | 9/1968 | Colgan et al. | 423/628 |
| 3,520,654 | 7/1970 | Carr et al. | 423/628 |

Primary Examiner—Herbert T. Carter
Attorney, Agent, or Firm—F. Lindsey Scott

[57] ABSTRACT

Alpha alumina monohydrate wherein a majority of the cumulative pore volume consists of pores from about 30 to about 120 A in diameter and a method for producing such alumina.

3 Claims, No Drawings

PROCESS FOR PRODUCING ALPHA ALUMINA MONOHYDRATE

This is a continuation of application Ser. No. 298,116, filed Oct. 16, 1972 and now abandoned.

FIELD OF THE INVENTION

This invention relates to alumina having modified properties and a process for producing such alumina. This invention further relates to alpha alumina monohydrate having a majority of its cumulative pore volume in the form of pores having a diameter from about 30 to about 120 A in diameter and a method for producing such alumina.

PRIOR ART

Numerous processes such as the hydrolysis of aluminum alkoxides, the sodium aluminate process, the alum process and the like are known for the production for alumina. Such alumina typically has a surface area from about 100 to about 350 m$^2$/g, a loose bulk density from about 20 to about 45 lb/ft$^3$ and, a pore volume (0–10,000 A) from about 0.5 to about 2.0 cc/g wherein the pore volume consists of pores having diameters varying from about 10 A to about 10,000 A in diameter.

In certain applications such as selective catalysis, gel permeation, molecular sieving and the like it is desirable that the pore volume be present in the form of pores having a restricted diameter range. Normally such desirable pores are distributed in a very narrow range such as ±15 A units.

The desirability of such alumina for use in hydrodesulfurization of heavy petroleum oils is shown in U.S. Pat. No. 3,668,116 issued June 6, 1972 to Adams et al. and U.S. Pat. No. 3,509,044 issued June 26, 1967 to Adams et al.

Other references considered in a prior art search on the concept of the present invention are U.S. Pat. No. 2,595,416 issued May 6, 1952 to Schmerling, U.S. Pat. No. 3,094,384 issued June 18, 1963 to Bertolacini and U.S. Pat. No. 3,264,062 issued Aug. 2, 1966 to Kehl et al. The references are considered illustrative of the state of the art.

In light of the desirability of product alumina having such narrow pore diameter distributions much time and effort has been devoted to the development of methods for producing such alumina.

OBJECTS OF THE INVENTION

It is an object of the present invention to provide an alpha alumina monohydrate having a majority of the total cumulative pore volume (0–10,000 A) in pores from about 30 to about 120 A in diameter. It is a further objective of the present invention to provide a method for producing such alumina.

SUMMARY OF THE INVENTION

It has been found that the objectives of the present invention are achieved in a process for producing alpha alumina monohydrate product having:
a. a loose bulk density from about 40 to about 60 lb/ft$^3$,
b. a surface area from about 100 to about 250 m$^2$/g,
c. a cumulative pore volume, 0–10,000 A from about 0.3 to about 0.6 cc/g, and
d. from about 75 to about 100 percent of said cumulative pore volume in pores from about 30 to about 120 A in diameter, by mixing 100 parts dispersible alpha alumina monohydrate with from about 30 to about 3000 parts water and from about 0.3 to about 40 parts acid to form a dispersion of uniform consistency and thereafter drying to produce alpha alumina monohydrate product having desirable properties.

DESCRIPTION OF PREFERRED EMBODIMENTS

The alpha alumina monohydrate of the present invention typically has a loose bulk density from about 40 to about 60 lb/ft$^3$, a surface area from about 100 to about 250 m$^2$/g, a cumulative pore volume (0–10,000 A) from about 0.3 to about 0.6 cc/g wherein from about 75 to about 100 percent of the cumulative pore volume consists of pores having a diameter from about 30 to about 120 A units. Such alumina is desirable for use as a catalyst generally and in addition is useful for selective catalysts, molecular sieve operations, gel permeation and the like. As noted hereinbefore, alumina having a high percentage of the pore volume (0–10,000 A) in the pore diameter range noted above is particularly desirable for hydrodesulfurization operations.

The alumina of the present invention is produced by mixing dispersible alumina with from about 30 to about 3000 parts water and from about 0.3 to about 40 parts acid per 100 parts alumina to form a dispersion of uniform consistency and thereafter drying to produce alpha alumina monohydrate having the desired properties.

As used herein, dispersible alumina refers to an alpha alumina monohydrate which is readily dispersed in water or aqueous 0.6 weight percent hydrochloric acid (37%) to produce an alumina dispersion. Such alumina typically appears to be a dry solid material but may contain in addition to Al$_2$O$_3$, free water, water of hydration and the like. Most dispersible alumina suitable in the process of the present invention contains less than about 85 weight percent Al$_2$O$_3$ and the mixture compositions stated herein are based on a dispersible alumina containing about 75 weight percent Al$_2$O$_3$. Particularly desirable results have been achieved wherein "DISPAL" alumina marketed by Continental Oil Company of 1300 Main Street, Houston, Texas was used. Such alumina is at least about 90 percent dispersible in a 0.6 w/o HCl (37%) formulation to produce a 10 percent alumina dispersion and typically has a loose bulk density from about 45 to about 50 lb/ft$^3$, pore volume (0–10,000 A) from about 0.45 to about 0.55 cc/g and a surface area from about 180 to about 220 m$^2$/g.

When the dispersible alumina used is not 100% dispersible it is necessary to separate the dispersed alumina phase from the non-dispersible alumina portion. Such separations are readily achieved by centrifugation, decantation, filtration and the like. The desired product alumina of the present invention is produced upon drying the alumina dispersion. When the amount of the non-dispersible alumina is slight or when the presence of substantial amounts of the non-dispersible alumina are allowable in the product alumina the separation step may be omitted. The descriptions of the invention in the present application describe the process of the present invention wherein the dispersible alumina is essentially 100% dispersible so that no filtration is required.

The alumina, acid and water may be mixed in any desired sequence although it is preferred that the acid and water be mixed and thereafter added to the alumina.

Suitable acids are inorganic acids, monofunctional aliphatic carboxylic acids containing from 1 to about 3 carbon atoms and halogenated monofunctional aliphatic carboxylic acids containing from about 2 to about 3 carbon atoms. Particularly desirable results have been obtained wherein the acid was selected from the group consisting of hydrochloric acid, nitric acid, acetic acid and monocloroacetic acid. Especially desirable results have been obtained wherein nitric acid was used. Although the ranges discussed above for the alumina, acid and water produce a desirable product it has been found that the most desirable product is obtained wherein from about 200 to about 400 parts water and from about 20 to about 40 parts acid are mixed with 100 parts dispersible alumina.

In a preferred embodiment of the present invention from about 200 to about 400 parts water, and from about 20 to about 40 parts acid are mixed with 100 parts "DISPAL" alumina to form a mixture of uniform consistency. The alpha alumina monohydrate produced by drying the mixture has a loose bulk density from about 50 to about 55 lb/ft$^3$, a surface area from about 175 to about 225 m$^2$/g and a cumulative pore volume, 0–10,000 A, from about 0.30 to about 0.35 cc/g wherein about 75 to about 90 percent of said cumulative pore volume consists of pores having a diameter from about 40 to about 65 A.

The alumina product so produced is readily dispersible in water and may be extruded readily by merely admixing a suitable quantity of water with the alumina and thereafter extruding. As is well known in the art such alumina is well adapted to admixture with solutions containing various anions, cations, metals and the like to produce catalytic extrudates. Many variations and modifications are possible and the material to be added will be selected by the user based upon his product requirements. The dispersibility of the extrudate may of course be destroyed by calcining as is well known in the art.

The alumina product so produced has been observed to be highly resistant to abrasion and the like and the alumina extrudates have been observed to have a high crush strength. Such properties are desirable in many operations wherein alumina catalysts are used such as hydrodesulfurization and the like.

It is further noted that while the alumina produced by the process of the present invention is readily dispersible in water when produced using a mono functional acid that alumina having a reduced dispersability may be produced by using a polyfunctional acid. The possible variations to fit special product requirements are legion and are well within the skill of those learned in the art.

Narrow pore volume distributions in the product alumina are achieved by the process of the present invention and very desirable alumina having from about 70 to about 90 percent of the cumulative pore volume in pores having a narrow variation in pore diameter i.e. from 70 to 90 percent of the pore volume consisting of pores having a diameter from 40 to 80 A (60 ± 20 A) has been produced. While applicants do not wish to be bound by any particular theory it appears that such narrow pore distribution ranges may be varied by varying the crystal size of the starting alumina, i.e. larger crystal sizes result in larger average pore diameters. It is believed that as the average pore diameter increases that the range in pore diameters also increases as illustrated below.

| Average Pore Diameter A | Variation (range) | % Total Cumulative Pore Volume 0–10,000 A in range |
|---|---|---|
| 50 | ±15 | 70 – 90 |
| *70 | ±25 | 60 – 85 |

*Estimate

Thus it is believed possible to vary the mean pore diameter and accordingly produce alumina having a narrow pore diameter distribution within a desired range.

The alumina of the present invention when used for various molecular sieving operations, virus recoveries and the like has an advantage over presently used materials in that the alumina is quite heat resistant and the entrapped materials such as viruses and the like may be readily removed by heating to elevated temperatures. As will be obvious to those skilled in the art the alpha alumina monohydrate of the present invention may also be converted to gamma alumina and the like by heating to elevated temperatures. Such conversions to other alumina forms is within the scope of the present invention and indeed in many uses it is contemplated that the alpha alumina monohydrate will be so converted.

Many variations and modifications are possible within the scope of the present invention and indeed such variations and modifications may appear obvious and desirable to those skilled in the art upon a review of the foregoing description of peferred embodiments and the following examples and claims.

EXAMPLES 100 g. of "DISPAL" alumina was combined with 297 g. of water and 3 g. of aqueous 70 weight percent nitric acid in a suitable container. The mixture was stirred for 30 minutes and thereafter transferred to a shallow container and heated to 250°F. to dry. The product alumina was broken into particles suitable for use as a catalyst, molecular sieve and the like and had the following properties:

a surface area of 207 m$^2$/g, a loose bulk density of 55 lb/ft$^3$ and a pore volume, 0–10,000 A, of 0.33 cc/g. It was found that 88 percent of the total cumulative pore volume, 0–10,000 A, consisted of pores having a pore diameter from about 50 to about 65 A.

It is thus shown that alumina of the present invention is readily produced from dispersible alumina materials and has totally unexpected properties which heretofore have been unavailable in alumina products.

Having thus described the invention, we claim:

1. A method for producing alpha alumina monohydrate product having:
   a. a loose bulk density from about 40 to about 60 lb/ft$^3$,
   b. a surface area from about 100 to about 250 m$^2$/g,
   c. a cumulative pore volume, 0–10,000 A from about 0.3 to about 0.6 cc/g, and
   d. from about 75 to about 100 percent of said cumulative pore volume in pores from about 30 to about 120 A in diameter;

by mixing 100 parts dispersible alpha alumina monohydrate with from about 30 to about 3000 parts water and from about 0.3 to about 40 parts acid, said acid being selected from the group consisting of hdyrochloric acid, nitric acid, acetic acid and monochloroacetic acid to form a mixture of uniform consistency and thereafter drying to produce alpha alumina monohydrate product having said properties.

2. The method of claim 1 wherein said 100 parts dispersible alpha alumina monohydrate is mixed with from about 200 to about 400 parts water and from about 20 to about 40 parts acid.

3. The method of claim 1 wherein said 100 parts alpha alumina monohydrate is "DISPAL" alumina and said alumina is mixed with from about 250 to about 350 parts water and from about 0.75 to about 2.0 parts nitric acid to produce a dispersible alpha alumina monohydrate having a. a loose bulk density from about 50 to about 55 lb/ft$^3$, b. a surface area from about 200 to about 225 m$^2$/g, c. a cumulative pore volume, 0–10,000 A from about 0.3 to about 0.35 m$^2$/g, and d. from about 85 to about 95 percent of said cumulative pore volume in pores from about 50 to about 65 A in diameter.

\* \* \* \* \*